United States Patent [19]

Bond et al.

[11] 4,123,220
[45] Oct. 31, 1978

[54] GAS MIXER AND REACTOR

[75] Inventors: Desmond H. Bond; George W. Taggart, both of Dallas; Kurt S. Jaeger, Hurst, all of Tex.

[73] Assignee: Ford, Bacon & Davis Texas, Inc., Garland, Tex.

[21] Appl. No.: 672,410

[22] Filed: Mar. 31, 1976

Related U.S. Application Data

[62] Division of Ser. No. 508,674, Sep. 23, 1974, Pat. No. 4,003,856.

[51] Int. Cl.² ............................................. F23D 15/02
[52] U.S. Cl. .................................. 431/353; 431/174; 431/175; 431/158; 422/165; 422/224
[58] Field of Search ................ 431/10, 351, 353, 174, 431/175, 284, 285, 158; 23/262, 277 R

[56] References Cited

U.S. PATENT DOCUMENTS

| 2,174,663 | 10/1939 | Keller | 431/115 X |
|---|---|---|---|
| 3,376,098 | 4/1968 | Pryor | 431/10 |
| 3,936,275 | 2/1976 | Perret et al. | 431/351 X |
| 4,021,186 | 5/1977 | Tenner | 431/352 X |

Primary Examiner—Edward G. Favors
Attorney, Agent, or Firm—Richards, Harris & Medlock

[57] ABSTRACT

A gas mixer and reactor is provided which is especially suitable as a burner which includes an elongated gas flow chamber with a nozzle arrangement at its inlet end for passing a first gaseous reactant into the interior of the chamber toward the outlet from points uniformly about the inner periphery of the chamber, and an annular nozzle arrangement near the outlet of the gas flow chamber for directing another gaseous reactant or reactants through the outlet of the gas flow chamber and into a thermal reaction chamber which communicates with the outlet of the gas flow chamber.

24 Claims, 8 Drawing Figures

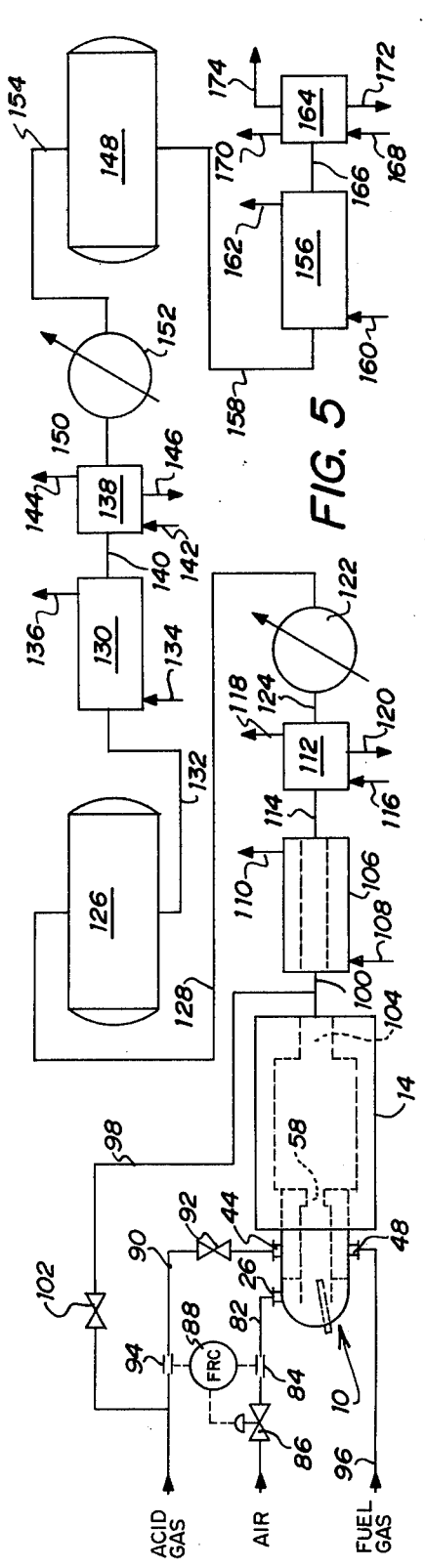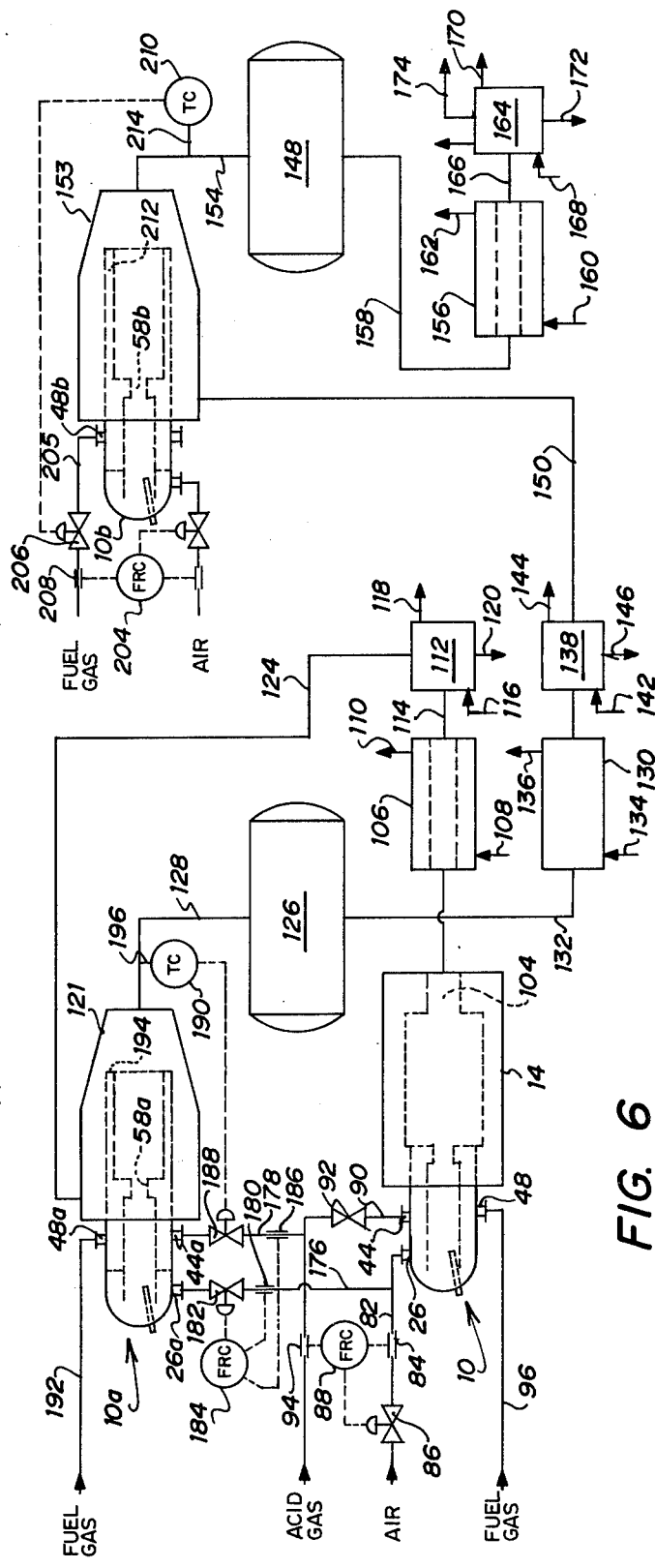
FIG. 5
FIG. 6

GAS MIXER AND REACTOR

BACKGROUND OF THE INVENTION

This is a divisional of copending U.S. application Ser. No. 508,674 filed Sept. 23, 1974 now U.S. Pat. No. 4,003,856.

This invention relates to gas mixers and reactors. In another aspect, this invention relates to gas burners. Still another aspect of this invention relates to a novel method and means for controlling the combustion of gaseous components. In still another aspect, this invention relates to a novel method and means for converting sulfur containing gases into sulfur. In another aspect, this invention relates to an acid gas burner for a plant for the recovery of sulfur from hydrogen sulfide.

Apparatus for reacting and combusting gaseous components wherein the relative quantities of gaseous reactants must be precisely controlled, such as substoichiometric burners, require not only means to effect an efficient mixing operation but sufficient flow control features to allow proper metering of the reactant materials. Most gas burners do not provide these features. Furthermore, conventional such burners and the like are subject to heat and/or chemical deterioration and do not provide a good visual contact with the combustion zone.

A conventional chemical process which requires a closely controlled gaseous feed is the so-called Claus process for converting hydrogen sulfide into elemental sulfur. The Claus process was developed in Germany in the late 19th Century and has undergone improvement through the years. The Claus process is described on pages 353 and 354 of Volume 19 of *Kirk—Othmer Encyclopedia of Chemical Technology*, 2nd Edition, 1969. In the process, hydrogen sulfide is conventionally fed into a combustion chamber and burned in such a manner that one-third of the volume of hydrogen sulfide is converted into sulfur dioxide. Alternately, a feed stream of concentrated hydrogen sulfide is split such that one-third is completely oxidized to sulfure dioxide and later combined with the remaining concentrated stream. Generally the products of combustion from the combustion chamber are initially cooled and then passed through a catalyst packed converter in which the following reaction occurs:

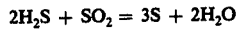

$$2H_2S + SO_2 = 3S + 2H_2O$$

Various combustion devices and gas reactors have been developed to convert the hydrogen sulfide into the $SO_2$-$H_2S$ feed stream for the Claus process. These devices are commonly known as acid gas burners. These acid gas burners admix a rich $H_2S$ gas stream with air to cause the proper reaction. The acid gas burner which is presently widely utilized comprises a burner tube having one end extending into the combustion chamber with a hemispherical cap mounted on the end thereof having a convex surface facing the combustion chamber. The cap has concentric sets of holes therethrough to provide diverging streams of the flow of the gas from the tube into the combustion chamber. Part of the $H_2S$ gas stream that is passed through these concentric sets of holes is burned primarily to $SO_2$. The burner is generally mounted through the wall of the combustion chamber and extends through a larger pipe. Air is fed through the annular space between the larger pipe and the burner. The air and acid gas mix adjacent the cap and are ignited at a high temperature (as high as 2000° to 2500° F.). The acid gas is highly corrosive and the high temperature reaction of the acid gas on the cap causes deformation of the burner cap and corrosion which in turn results in high pressure drop and back pressure in the system. Furthermore, this deleterious action results in the inability to properly control the substoichiometric reaction. Additionally, this type of burner is not a good mixer of the gaseous fluids and is not necessarily stable over a full range of operation.

Improvements have been attempted in acid gas burners and similar gas reactors to provide for a thorough admixing of the gaseous reactants but yet diminish both thermal and chemical deterioration of metal parts. An example of such apparatus is disclosed in U.S. Pat. No. 3,782,884.

SUMMARY OF THE INVENTION

According to one embodiment of the subject invention a gas mixer and reactor is provided which comprises an elongated gas flow chamber with nozzle means at its inlet end for introducing a uniform flow of gas about its inner periphery, a thermal reaction zone operatively communicating with the outlet end thereof and a second nozzle means positioned about the outlet end of said gas flow chamber to direct at least one gaseous component inwardly into the gas flow chamber at an angle toward the thermal reaction chamber. The positioning of the first and second nozzle means provides for thorough intermixing of the gaseous components by the time they reach the thermal reaction zone, and the elongated configuration of the reactor allows for visual contact in the combustion zone while minimizing unwanted thermal convection and radiation thereto and chemical deterioration thereof. According to a preferred embodiment of said one embodiment, the thermal reaction zone comprises a shortened tubular member having its inlet end contiguous with the outlet of the gas flow chamber, and an inset annular step at the opposite end thereof thereby forming the outlet opening thereof.

According to another embodiment of the subject invention the above described gas mixer and reactor is provided for admixing and reacting gaseous components by introducing a first gaseous component into an elongated gas flow zone at points uniformly about the inner periphery thereof, i.e. radially, flowing the first gaseous component axially through said elongated gas flow zone; injecting a second gaseous component into the first gaseous component as it passes from said elongated gas flow zone from multiple points annular of said zone and in the direction of the flow of the first gaseous component causing a thorough mixing of the first and second gaseous components; and passing the first and second gaseous components while admixing into a reaction zone wherein the components are reacted. The process carried out in accordance with this embodiment results in an extremely efficient mixing of the gaseous components while they are reacted. The second gaseous component can comprise one or more reactants. Furthermore the second gaseous component is injected into the first gaseous component in one of two preferred modes. The first mode includes injecting the second gaseous component generally from annular arranged nozzles positioned near the outlet of the gas flow zone such that their point of impingement will be within mid-portion of the thermal reaction zone. The second preferred mode is to inject the second gaseous component from nozzles positioned around the outlet of the elongated gas flow zone but positioned in a skewed manner such that they will impinge at the point of intersection between above described inset step and the inside wall of the thermal reaction zone of said preferred embodiment. This embodiment can be used to effect any gaseous reaction with either stoichiometric or substoichiometric quantities of reactants. For example, in accordance with another embodiment of the subject invention, a light hydrocarbon fuel is combusted with a substoichiometric quantity of air to produce hydrogen containing product stream containing no free carbon which in turn can be used in conventional reducing processes, for example, processes for reducing sulfur compounds.

In accordance with still a further embodiment of the subject invention, the gas mixer and reactor of said one embodiment is utilized to prepare a hydrogen sulfide-sulfur dioxide feed stream for the Claus sulfur conversion process. In a specific embodiment, the reactors of the subject invention are utilized not only to produce the initial feed stream but also to supply heat to the feed stream in line with the catalytic reactor.

BRIEF DESCRIPTION OF THE DRAWINGS

This invention can be more easily understood from the study of the drawings in which:

FIG. 5 is a schematic diagram showing the apparatus of FIG. 1 utilized as an acid gas burner in the Claus sulfur recovery process;

FIG. 6 is a schematic view showing the apparatus of FIG. 1 as both the acid gas burner and in-line burner for the feed heater for the catalytic reactor of the Claus sulfur recovery process;

DETAILED DESCRIPTION OF THE INVENTION

Figure 1:
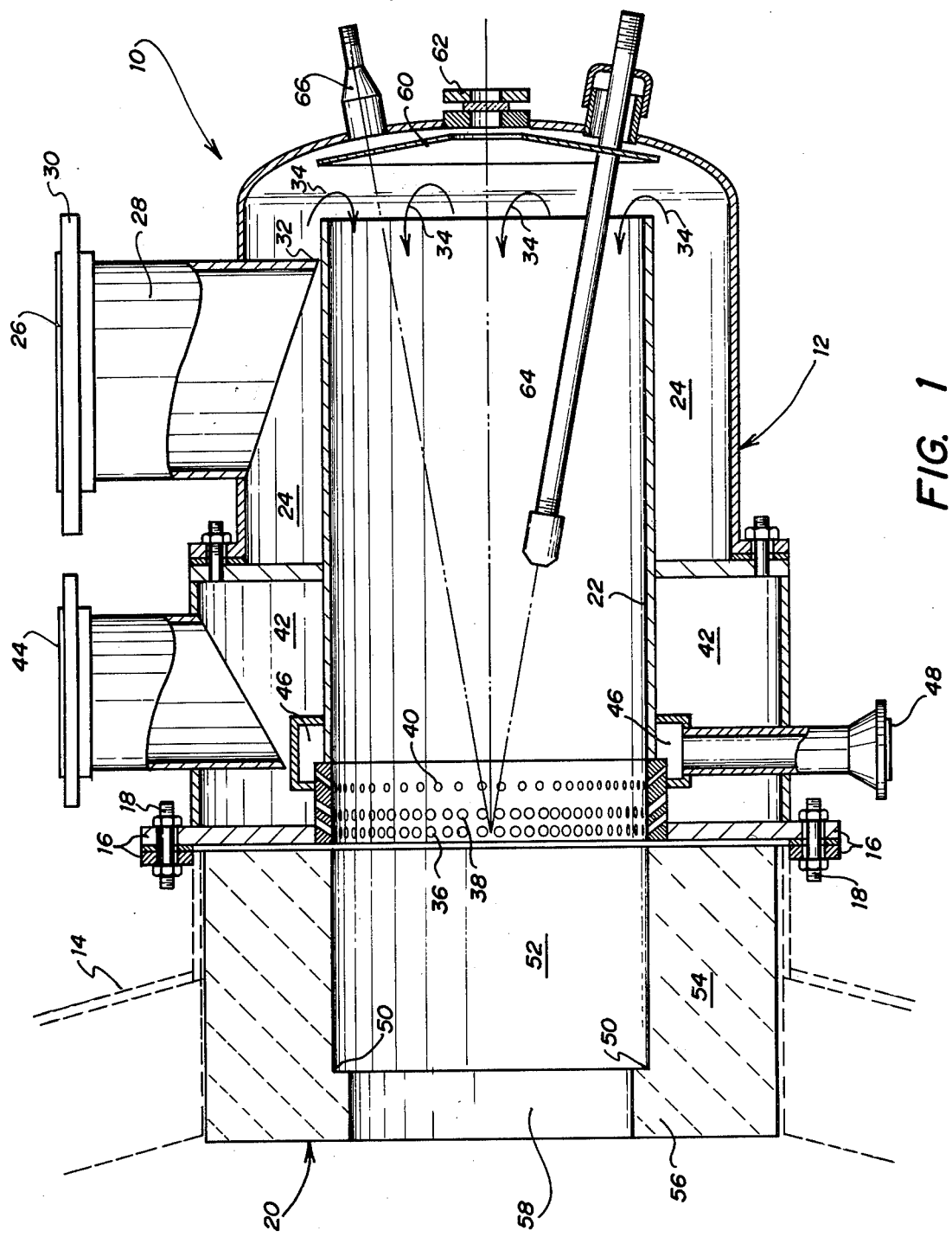
FIG. 1 is a sectional view of a preferred gas mixer and reactor of the subject invention.

Now referring to FIG. 1, a preferred embodiment of the subject invention is shown as gas mixer and reactor 10. Gas mixer and reactor 10 basically comprises a metallic gas injector member 12 which is attached to a furnace 14 via flanges 16 and nut and bolt assemblies 18, and tile member 20 which forms the inlet of furnace 14.

Elongated gas flow chamber 22 is positioned within gas injector member 12 and communicates with gas supply manifold 24 on its inlet end and with tile member 20 on its outlet end. It is noted that elongated gas flow chamber 22 can have any convenient cross-sectional configuration such as for example oval, rectangular or square, but it is preferred that it have a circular cross-sectional configuration and comprise a cylindrical shape. Therefore, elongated gas flow chamber 22 will hereinafter be described as having a generally circular cross-sectional area. Gas supply manifold 24 is positioned around the first end of elongated gas flow chamber 22 and communicates with gas inlet port 26. Gas inlet port 26 basically comprises a cylindrical inlet member 28 with suitable connecting flange 30. The internal end 32 of cylindrical member 28 extends to a point closely adjacent to the sidewall of elongated gas flow chamber 22 and is cut in a tapered manner as shown in the drawings to provide a baffle or is otherwise baffled to assure that gas passing through the inlet port 26 will uniformly fill the manifold 24 and pass into the interior of the elongated gas flow chamber 22, radially, (in an annular flow path as illustrated by arrows 34). It is noted that in some instances the baffle can be totally eliminated, if desired.

Three rows of apertures 36, 38 and 40 are positioned about the outlet end of elongated gas flow chamber 22. As shown, nozzle apertures 36 and 38 communicate with annular gas manifold 42. Gas inlet port 44 which is a similar configuration to gas inlet port 26 operatively communicates with annular gas manifold 42. Similarly, nozzle apertures 40 communicate with annular gas manifold 46 which in turn operatively communicates with gas inlet port 48. As shown, nozzle apertures 36, 38 and 40 are angled toward the interior of tile member 20. In a preferred embodiment nozzle apertures 36, 38 and 40 are angled for impingement at the center line or axis of the reaction chamber 52 within tile member 20. According to an alternate preferred embodiment, nozzles 36, 38 (and 40, if desired) are skewed in relation to one another and directed toward impingement at points 50 within tile member 20. It should be noted that the subject invention can utilize any number of nozzle apertures such as 36, 38 and 40 spaced relative to one another in any desired number of rows, but three rows of such nozzle apertures are shown together with the annular gas manifolds 42 and 46 for illustrative purposes only.

Tile member 20 basically comprises a short cylindrical reaction chamber 52 made from ceramic tile members 54. Inset annular step 56 is positioned at the outlet of reaction chamber 52 and extends inwardly in an annular manner to thereby form an outlet aperture 58 which is smaller in diameter than the interior of reaction chamber 52.

Radiation shield 60 is positioned adjacent the inlet end of elongated gas flow chamber 22 and comprises a dish shaped member having a reflective surface which faces the interior of elongated gas flow chamber 22. Sight port 62 is positioned behind radiation shield 60 on the axis of elongated gas flow chamber 22. Pilot burner 64 extends through the sidewall of gas injector member 12, radiation shield 60, and to a point adjacent the midportion of elongated gas flow chamber 22 as shown in FIG. 1. Furthermore, scanner mount 66 is positioned through the sidewall of gas injector member 12 and in alignment with suitable aperture means through radiation shield 60. As shown in broken lines in FIG. 1 a focal point between the projection of pilot burner 64, sight port 62, and scanner mount 66 exists at the end of elongated gas flow chamber 22.

Figure 2:
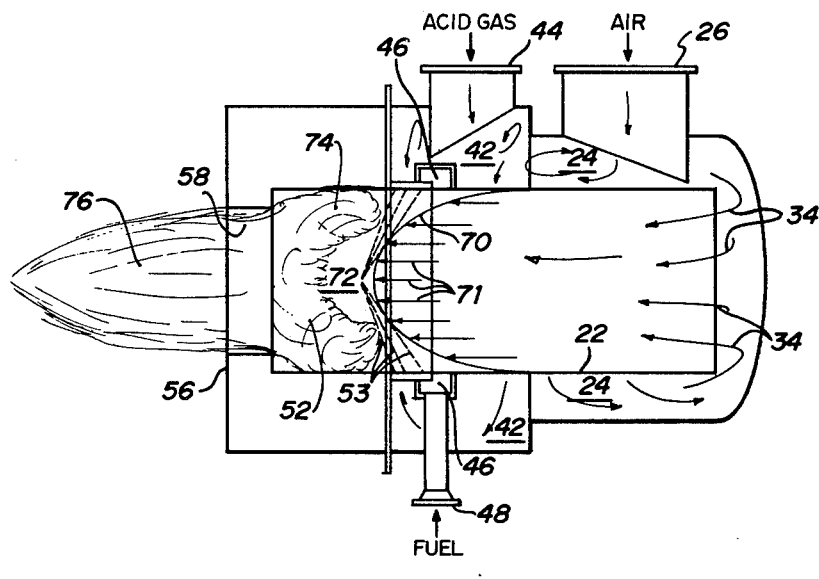
FIGS. 2 through 4 are schematic views showing various modes of operation of the apparatus set forth in FIG. 1.
Figure 3:
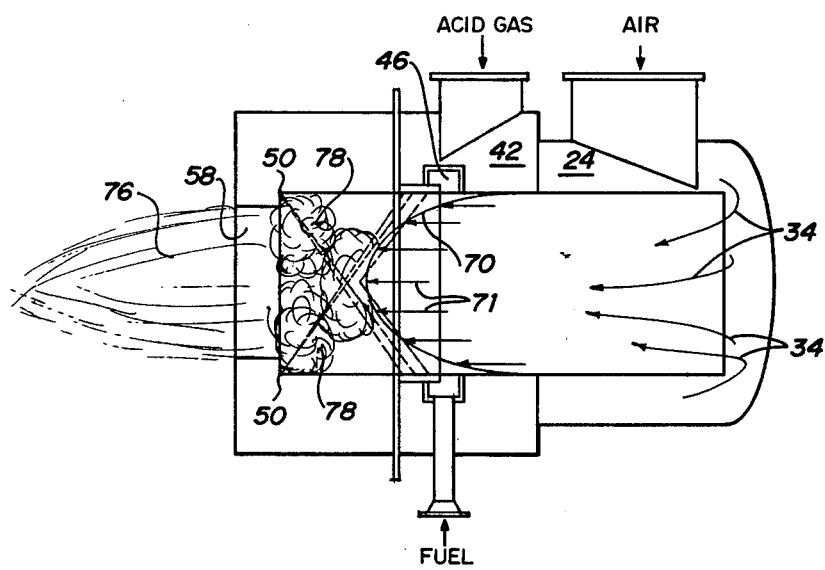
Figure 4:
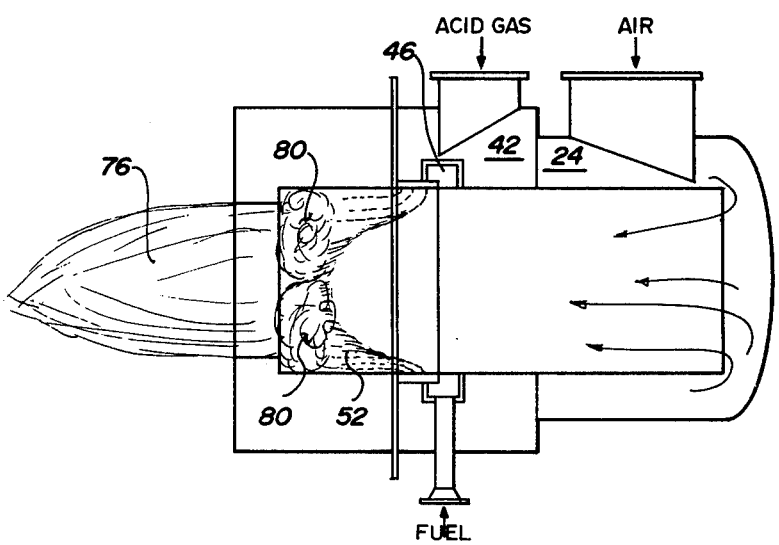

The gas mixer and reactor 10 can be utilized to react various gaseous constituents in three basic modes of operation as illustrated in FIGS. 2, 3 and 4. The three basic modes of operation of gas mixer and reactor 10 will be illustrated in relation to the process of forming an $H_2S$-$SO_2$ mixture from acid gas ($H_2S$ rich gas) for use in a Claus sulfur conversion process. In this process, air is preferably delivered to gas manifold 24 via gas inlet port 26, the acid gas is delivered to annular gas manifold 42 via gas inlet port 44 and a fuel gas is delivered (if desired) to gas manifold 46 via gas inlet port 48. As will be described in detail in relation to FIGS. 5 and 6, the fuel gas need not be delivered at all times during the operation of gas mixer and reactor 10, but FIGS. 2–4 will be described showing the fuel gas being injected into reaction zone 52. Thus, acid gas is delivered from nozzle apertures 36 and 38 while gaseous fuel such in the lower molecular weight hydrocarbon gas is delivered from nozzle apertures 40.

The first mode of operation is shown in FIG. 2 which utilizes relatively high flow rates of all three gaseous streams, and nozzle apertures 36, 38 and 40 are angled in such a manner as to converge on the centerline of the short cylindrical reaction chamber 52, and within reaction chamber 52. The fuel and oxygen are delivered in such ratios as to convert one-third of the hydrogen sulfide within the acid gas stream to sulfur dioxide. Furthermore, increasing amounts of fuel and/or oxygen can be utilized to destroy any other impurities which may be contained within the hydrogen sulfide rich fuel gas stream. Such impurities include ammonia and other nitrogen, carbon, and hydrogen containing compounds.

As shown in FIG. 2, the nozzle apertures 36, 38 and 40 are directed into the reaction chamber 52 and impinge at the center line or axis of reaction chamber 52 as shown by arrows 33. The air is introduced through gas port 24 and passes around the annular gas flow manifold 24 and then radially into the interior of elongated gas flow chamber 22 as shown by arrows 34. The introduction of the air in a uniformly annular manner about the inner periphery of elongated gas flow chamber 22 results in a substantially parabolic velocity front 70 as depicted by flow arrows 71 in FIG. 2. This substantially parabolic velocity front passes through the elongated gas flow chamber 22 into the turbulent region 72 formed by impingement of the acid gas and fuel gas streams within reaction chamber 52 to form a uniform mixture depicted as 74 of air, acid gas and fuel gas which is ignited (initially by the action of the pilot burner 64 not shown in FIG. 2). It is noted that the action of inset annular step 56 on the gas mixture results in further turbulence and further admixing as combustion occurs and the combusting mixture of expanding gases 76 exit via outlet aperture 58.

In the second mode of operation as schematically depicted in FIG. 3, the gas flow rates of all three streams are generally high as described in FIG. 2 but nozzle apertures 36 and 38 and if desired, 40, are skewed and directed toward points 50 which comprises the intersection between inset annular step 56 and the internal periphery of reaction chamber 52. When operating in this mode the air is passed radially inwardly into the interior of elongated gas flow chamber 22 as described in relation to FIG. 2 to form the substantially parabolic velocity front 70. Furthermore, the acid gas passing from nozzle apertures 36 and 38 impinges upon points 50 to form areas of turbulence 78. The nozzle apertures 40 can either be skewed to contact points 50 or merely aimed at the center line of reaction chamber 52 in a manner described above in relation to FIG. 2. As shown in FIG. 3, nozzle apertures 40 are angled to impinge on the center line within reaction chamber 52. The substantially parabolic velocity front of air 70 contacts the points of impingement and turbulence thereby created at 78 to form a uniform mixture of the air and acid gas. The mixture is ignited initially by the action of pilot burner 64 to form the combusting mixture 76 which is passed into the furnace via aperture 58.

The third mode of operation is schematically illustrated in FIG. 4. In this mode of operation the gas flow rates from apertures 36, 38 and 40 is relatively low. As shown, the flow rates of acid gas and fuel gas from nozzle apertures 36, 38 and 40 are not of sufficient velocity to cause impingement either at the center line within reaction chamber 52 or at points 50 opposite the nozzle apertures. The flows from these nozzle apertures merely trails along the inner periphery of reaction chamber 52 with only a small amount of mixing occurring with the air stream until contact is made with inset annular step 56. At this point turbulent areas 80 result to cause intimate admixture of the acid gas, fuel and air. The mixture is ignited and the combusting mixture 76 is passed from the thermal reaction zone via outlet aperture 58. In this mode, with the low flow rates, it is many times necessary to maintain a constant pilot flame emitting from pilot burner 64 (not shown in FIG. 4).

It is noted that in all three modes of operation as described above in relation to FIGS. 2, 3 and 4 the interior or reaction zone 52 is readily viewable via sight port 62 (FIG. 1). In addition, since the gas flows are constantly passing from gas injection member 12 to the interior of the ceramically lined tile member 20, and because of the relatively great distance from the metal parts within gas injector member 12 from reaction chamber 52, thermal convection and heat deterioration of the metal parts within the gas injector member 12 are diminished. In addition, the orientation of elongated gas flow chamber 22 is such that the gases flowing therethrough provide a cooling effect for all metal parts. Furthermore, elongated gas flow chamber 22 is so disposed as to be shielded from radiation. Furthermore, very little corrosive action can occur to the metal parts within the gas injector member 12 since the mixing and combusting operations mainly occur within the tile member 20.

Now referring to FIG. 5 a schematic view is illustrated of a two stage Claus conversion process utilizing the novel gas mixer and reactor of the subject invention as the acid gas burner. As set forth above, the fuel is burned under oxygen deficient conditions such that the products of combustion include two-thirds of the original hydrogen sulfide, the other third being acidized, i.e., $6H_2S + 3O_2 = 4H_2S + 2SO_2 + 2H_2O$. This provides the proper ratio of hydrogen sulfide to sulfur dioxide which is passed through the conventional catalytic converter in the Claus process and reacted as follows: $4H_2S + 2SO_2 = 6S + 4H_2O$.

As shown in FIG. 5 air is delivered to gas inlet port 26 of gas mixer and reactor 10 via conduit 82. Flow rate sensor 84 and flow control valve 86 are operatively positioned within conduit 82. Flow rate sensor 84 is connected to an input of flow ratio controller 88 and flow control valve 86 is operatively connected to the output of flow ratio controller 88. Acid gas is passed to gas inlet port 44 of gas mixer and reactor 10 via conduit 90. Conduit 90 has valve 92 and flow rate sensor 94 operatively positioned therein. Flow rate sensor 94 is operatively connected to an input of flow ratio controller 88 as shown in the drawings. Fuel gas is supplied to gas inlet port 48 via conduit 96. It is also noted that bypass conduit 98 operatively communicates between conduit 90 and conduit 100 and has valve 102 operatively positioned therein.

As schematically depicted in FIG. 5, outlet 58 of gas mixer and reactor 10 communicates with the interior of furnace 14. The outlet 104 of furnace 14 communicates with boiler 106 via conduit 100 wherein the hot gases pass in indirect heat exchange contact with water. Water is passed into boiler 106 via conduit 108 and is removed therefrom via conduit 110 as steam. The gas outlet of boiler 106 operatively communicates with condenser 112 via conduit 114 wherein the gaseous products are further cooled by passing in indirect heat exchange contact with water. Again water is passed into condenser 112 via conduit 116 and steam is removed therefrom via conduit 118. The cooling action within condenser 112 results in the condensation of some sulfur from the gases. This liquid sulfur is removed from condenser 112 via conduit 120. The gas from condenser 112 pass to heater 122 via conduit 124 and from heater 122 to the Claus catalytic converter unit 126 via conduit 128. The Claus converter 126 contains a conventional catalyst such as bauxite for converting the $H_2S$-$SO_2$ mixture into sulfur. The effluent from the Claus catalytic converter 126 is passed to boiler 130 via conduit 132 wherein it is passed in indirect contact with water. Water passes into the boiler 130 via conduit 134 and steam is removed via conduit 136. The cooled gases from boiler 130 are passed to condenser 138 via conduit 140 and therein placed in indirect heat exchange contact with further amounts of water which passes into condenser 138 via conduit 142 and is converted to steam which is passed from condenser 138 via conduit 144. This action condenses sulfur which is removed as liquid from condenser 138 via conduit 146. The gaseous effluent from condenser 138 is passed into a second Claus catalytic converter 148 via conduit 150, heater 152, and conduit 154. Residual $H_2S$ and $SO_2$ are converted to sulfur and water within Claus converter 148 and the product vapors are passed to boiler 156 via conduit 158. Again, the gas stream is passed in indirect heat exchange contact with water which passes into boiler 156 via conduit 160 and is removed therefrom as steam via conduit 162. The cooled gas stream is then passed into condenser 164 via conduit 166 wherein it is again passed in indirect heat exchange contact with water which passes into condenser 164 via conduit 168 and is removed therefrom as steam via conduit 170. The cooling results in liquefaction of the sulfur which is passed from condenser 164 via conduit 172. Any residual gases are passed to an incinerator and burned via conduit 174.

In operation of the process schematically depicted in FIG. 5, for acid gas feed streams containing approximately 15% to 100% (by mole) hydrogen sulfide, the fuel is burned under oxygen deficient conditions such that the products of combustion include two-thirds of the original hydrogen sulfide. Other components in the acid gas stream can be either inert or combustible, and combustible compounds must be oxidized to $CO$, $CO_2$, $N_2$, $H_2$ and $H_2O$. Additional oxygen is required in this instance. The desired result is to have two parts of $H_2S$ and one part of $SO_2$ and no other reactive compounds in the acid gas feed stream. In this instance, valve 92 is maintained open while valve 102 is maintained closed.

For acid gas fuels containing less than about 50% $H_2S$ and more than about 15% $H_2S$ the gas mixer and reactor 10 is required to satisfactorily process a progressively less fuel rich condition. For acid gas feeds that contain less than 15% acid gas the combustion of hydrogen sulfide is approximately stoichiometric, i.e., $2H_2S + 3O_2 = 2H_2O + 2SO_2$. In this instance, the required hydrogen sulfide for the reaction is obtained by directing a portion of the original fuel around the burner via conduit 98. Thus, valve 92 and 102 are adjusted such that one-third of the original hydrogen sulfide will pass via conduit 90 and valve 92 and the other two-thirds of the original hydrogen sulfide will pass through conduit 98 and valve 102. It is also noted that fuel gas is supplied to gas inlet 48 via conduit 96 generally for preheating of the processing equipment and for adding heat when processing acid gas containing low molar quantities of hydrogen sulfide, or for adding gas bulk at low throughputs in device 10.

Typical operating conditions of gas mixer and reactor 10 are set forth in Table 1 below:

Table 1

| | |
|---|---|
| Furnace pressure | about 0 to 12 psig |
| Furnace temperature | about 1800° F to 3000° F |
| Flow rate of all gas streams | about 10 to 10,000 moles/hr |
| Fuel temperature | about 60° F to 220° F |
| Air temperature | ambient to about 220° F |
| Acid gas pressure | about 0 to 12.5 psig |
| Air pressure | about 0 to 12.5 psig |
| $H_2S$ to $O_2$ molar ratio | about 2:1 to 2:3 |

It is noted that there is no fundamental limit to furnace pressure and temperature nor to fuel pressure. Generally the air and/or fuel temperatures of about 1000° F. are the practical limit because this is the limit of present day materials technology.

The range of gross througput of acid gas is preferably about 6 moles per hour to about 500 moles per hour even though quantities below and above this range can be utilized. The fuel gas can comprise any low molecular weight hydrocarbon such as natural gas, coke oven gas, refinery fuel gas and the like, and mixtures thereof.

As a specific example, gas mixer and reactor 10 can have the following dimensions listed in Table 2 below:

Table 2

| | |
|---|---|
| Inside diameter of elongated gas flow chamber 22 and reaction chamber 52 | 14 inches |
| Length of elongated gas flow chamber 22 | 30 inches |
| Length of reaction chamber 52 | 18 inches |
| Height of inset annular step 56 | 1 inch |
| Width of inset annular step 56 | 4 inches |
| Number of nozzle apertures 36 and 38 | 110 |
| Diameter of nozzle apertures 36 and 38 | 0.4375 inch |
| Number of nozzle apertures 40 | 4 |
| Diameter of nozzle apertures 40 | 0.1875 inch |

Furthermore, the axis of the nozzle apertures 36 and 38 can be preferably oriented as follows: with origin at the intersection of the center of each nozzle aperture 36 and 38 and an element of the elongated gas flow chamber 22 parallel to the axis of the elongated gas flow chamber 22; take the element of the elongated gas flow chamber 22 as X, a diameter of the elongated gas flow chamber 22 as Y, the line mutually perpendicular to X and Y being Z; the projection of the axis of each nozzle aperture making an angle of 24.5° to the X axis in the XZ plane, and angle of 34.9° in the XY plane and angle of 33.3° in the YZ plane.

Using this gas mixer and reactor 10 when processing an acid gas stream containing $H_2S$ in concentrations of 44.86 mole percent in the system of FIG. 5, valve 102 is closed and valve 92 fully opened. In this instance, the fuel gas is passed into gas inlet port 48 and through nozzle apertures 40 for the purpose of preheating processing equipment. Alternately, the fuel gas can be passed into inlet port 48 for adding heat when processing low molar concentrations of hydrogen sulfide or merely adding bulk at low throughput. However, the gas is used in this example solely to preheat the equipment. In this instance, 4250 standard cu. ft. per hour of 725 BTU per standard cu. ft. refinery fuel gas is combusted with air in the range of from 100% or more excess air to an air deficiency condition. The same amount of fuel can be used to introduce the same quantity of fuel into the air stream while also injecting acid gas to the appropriate jets. Alternately while firing a fuel gas of high combustion temperature for preheating equipment the acid gas nozzle apertures 36 and 38 can be used to inject steam or inert gas for temperature moderation to the extent of about 50 moles per hour.

After the equipment had been warmed, the fuel gas is shut off and acid gas and air supplied are to the gas mixer and reactor 10 under the conditions set forth in Table 3 below:

Table 3

| | |
|---|---|
| Acid gas rate | 195.05 moles per hour |
| Air rate | 213 moles per hour |
| Heat release | 6.35 million BTU per hour |
| Furnace pressure | 5.5 psig |
| Acid gas pressure | 6.0 psig |

The hot combustion products pass from outlet 104 of furnace 14 and into boiler 106 wherein they are cooled to a temperature in the range of from about 400° F. to 800° F. The process stream from boiler 106 is cooled in condenser 112 to a temperature in the range from about 270° F. to 390° F. and liquid sulfur removed therefrom via conduit 120. The gaseous effluent from condenser 112 is then passed to heater 122 wherein it is maintained at a temperature in the range of from about 350° F. to 450° F. and then passed into the catalytic Claus converter 126. The process stream from the catalytic Claus converter 126 is next passed through boiler 130 wherein it is cooled to a temperature in the range from about 400° F. to 800° F. The cooled gaseous effluent is then passed via conduit 140 to condenser 138 wherein it is cooled to a temperature in the range from about 270° F. to about 390° F. Free sulfur is liquefied and removed via conduit 146. The gaseous effluent from condenser 138 is passed through heater 152 and maintained at a temperature in the range of from 350° F. to about 450° F. and thereafter passed to Claus catalytic converter 148 via conduit 154 wherein remaining portions of $H_2S$ and $SO_2$ are converted to sulfur vapor. The product stream from Claus converter 148 is passed to boiler 156 via conduit 158. Process stream is then passed to condenser 164 wherein the sulfur is liquefied and removed therefrom via conduit 172. The residual waste gas is generally passed to an incinerator via conduit 174 or to an additional catalytic stage or to another facility for additional processing.

The steam removed via conduits 110, 136 and 162 is generally high pressure steam and can be used as the heat source for heaters 122 and 152 as well as to heat a sump in which the liquid sulfur is passed for the purpose of maintaining the sulfur in the liquid state. The steam removed via conduits 118, 144, and 174 is generally low pressure steam but can be used as process gas or in the same manner as the above described high pressure steam. It should be noted that the schematic process depicted in FIG. 5 is set forth for illustrative purposes only and many variations thereto can be made. For example, any or all of the boilers 106, 130 and 156 can be eliminated and their cooling function performed by condensers 112, 138 and 164 respectively, and in this instance all steam production is at low pressure.

Now referring to FIG. 6 a preferred embodiment of the subject invention is schematically illustrated wherein gas mixers and reactors of the subject invention not only function as the acid gas burner in a Claus sulfur recovery process, but also function as an in-line heater for supplying heat and $H_2S$ - $SO_2$ feed to the Claus catalytic converters. As shown in FIG. 6, gas mixer and reactor 10 is hooked up with fuel gas, air and acid gas feed streams by the same basic conduit arrangement as shown in FIG. 5. It is noted that conduit 98 which passes between conduit 90 and conduit 100 in FIG. 5 is omitted since FIG. 6 is designed basically to convert acid gas streams containing high percentages of $H_2S$.

Furnace 14, boiler 106, and condenser 112 are all the same with attaching conduits as shown in FIG. 5. However, heater 122 has been replaced by heater 121 which in turn is fired by gas mixer and reactor 10a. As shown, gas mixer and reactor 10a is basically of the same general configuration as gas mixer and reactor 10 with a gas inlet port 26a for admitting air thereto; a gas inlet port 44a for admitting acid gas thereto; and a gas inlet port 48a for admitting fuel gas thereto. As shown, conduit 176 operatively communicates between air inlet conduit 82 and gas inlet 26a and has flow rate sensor 180 and flow control valve 182 operatively positioned therein. Flow control valve 182 is operatively connected to output of flow ratio controller 184. Flow sensor 180 is operatively connected to an input of flow ratio controller 184.

Furthermore, conduit 178 operatively communicates between acid gas inlet conduit 90 and gas inlet port 44a and has flow rate sensor 186 and flow control valve 188 operatively positioned therein. Flow rate sensor 186 is operatively connected to an input of flow ratio controller 184 and flow control valve 188 is operatively contacted to the output of temperature controller 190. Fuel gas supply conduit 192 operatively communicates with gas inlet port 48a. As shown, the outlet 58a of gas mixer and reactor 10a communicates with annular deflector 194 within a heating chamber within heater 121. Conduit 124 communicates with a heating chamber within heater 121. Conduit 128 operatively communicates between the outlet of heater 121 and the inlet of Claus sulfur reactor 126. Temperature sensor 196 is operatively positioned within conduit 128 and in turn is connected to the input of temperature controller 190. Boiler 130 and condenser 138 with their connecting conduits are substantially the same as corresponding components set forth in FIG. 5. Heater 152 has been replaced by heater 153 which is fired by gas mixer and reactor 10b as shown in the drawings. Gas mixer and reactor 10b can be the same as gas mixer and reactor 10a except gas inlet port 44b which is the normal acid gas inlet port is plugged. Gas inlet port 26b is operatively connected to air conduit 198 which has flow control valve 200 and flow rate sensor 202 operatively positioned therein. Flow control valve 200 is operatively connected to the output of flow ratio controller 204 and flow rate sensor 202 is operatively connected to an input of flow ratio controller 204 as schematically illustrated in FIG. 6. Gas inlet port 48b is operatively connected to fuel gas inlet conduit 205 which has flow control valve 206 and flow rate sensor 208 operatively positioned therein as illustrated in FIG. 6. Flow control valve 206 is operatively connected to the output of temperature controller 210 and flow rate sensor 208 is operatively connected to an input flow ratio controller 204 as illustrated in the drawing.

Outlet 58b of gas mixer and reactor 10b operatively communicates with annular deflector 212. The outlet of heater 153 operatively communicates with Claus catalytic converter 148 via conduit 154. Temperature sensor 214 is operatively positioned within conduit 154 and is operatively connected to the input of temperature controller 210. Boiler 156, and condenser 164 with their connecting conduits are the same as those components shown in FIG. 5.

In operation, gas mixer and reactor 10 can be of the same dimensions as set forth in Table 2 above. As an example of a process for converting a hydrogen sulfide gas stream containing 98.96 mole percent hydrogen sulfide (dry basis) to a $H_2S$ - $SO_2$ mixture for Claus convertors 126 and 148, gas mixer and reactor 10 is operated under the conditions set forth in Table 4 below:

Table 4

| Acid gas rate | about 211 moles/hr |
|---|---|
| Air rate | about 505 moles/hr |
| Fuel gas rate | about 18.8 moles/hr |
| Heat release | about 12,600,000 BTU/hr |
| Furnace pressure | about 9 psig |
| Acid gas pressure | about 10 psig |
| Fuel gas pressure | about 50 psig |

The reaction products are then passed through boiler 106 and condenser 112 which operate in a manner set forth in the discussion of FIG. 5. The liquid sulfur is removed via conduit 120 while gaseous effluent is passed to heating chamber 121 via conduit 124. Gas mixer and reactor 10a can have the following dimensions set forth in Table 5 below:

Table 5

| Diameter of elongated gas flow chamber 22 and thermal reaction chamber 52 | 5.7 inches |
|---|---|
| Length of elongated gas flow chamber 22 | 13 1/8 inches |
| Number of acid gas nozzles 36 and 38 | 42 |
| Diameter of acid gas nozzles 36 and 38 | 7/32 inch |
| Length of thermal reaction chamber 52 | 11 1/2 inches |
| Height of inset annular step 56 | 7/8 inch |
| Width of inset annular step 56 | 3 3/4 inches |
| Number of fuel gas nozzles 40 | 18 |
| Diameter of fuel gas nozzles | 3/32 inch |

Furthermore, gas mixer and reactor 10a is operated under the conditions set forth in Table 6 below:

Table 6

| Acid gas rate | 18.27 lb. moles per hr. |
|---|---|
| Air rate | 43.8 lb. moles per hr. |
| Fuel gas rate | 1.63 lb. moles per hr. |
| Heat release | 1.16 million BTU per hr. |
| Line pressure | variable |
| Acid gas pressure | 7 psig |

Thus heater 121 will preheat the process stream from condenser 112 as well as supply further amounts of $H_2S$ - $SO_2$ feed to Claus catalytic converter 126. Temperature controller 190 is set to maintain the hot gases passing through conduit 128 at a temperature of about 400° F. and when temperatures above or below this value occur, temperature controller 190 either opens or closes valve 188 proportionally. Flow ratio controller 184 controls valve 182 and is in turn controlled by the ratio of flows in conduits 178 and 176.

As stated above, the gases are passed through Claus catalytic converter 126 and the hot gases from the catalytic converter 126 are passed sequentially through boiler 130 and condenser 138 and liquid sulfur is removed via conduit 146. The gaseous products from condenser 138 are passed to the interior of heating chamber 153. Gas mixer and reactor 10b can have the same basic configuration as gas mixer and reactor 10a and is operated under the circumstances set forth in Table 7 below:

Table 7

| Heat content of the fuel gas | about 900 BTU per standard cu. ft. |
|---|---|
| Fuel gas rate | about 1840 standard cu. ft. per hr. |
| Air rate | about 11,600 standard cu. ft. per hr. |
| Fuel gas nozzle 40 | 18 |
| Nozzle diameter | 3/32 inch |

It is noted that gas mixer and reactor 10b should preferably operate at about 90% of stoichiometric air because of greater freedom to accept pressure transients; however, operation much closer to stoichiometric will conserve the fuel. This heating in heater 153 will assure that the hydrogen sulfide-sulfur dioxide stream passed through the interior of heater 153 wil be heated to a proper temperature in the range from about 350° to about 450° F. It is noted that temperature controller 210 will control the positioning of valve 206 in fuel conduit 205 in response to variations in the temperature of the gases passed to catalytic converter 148 via conduit 154. At the same time, flow rate controller 204 which operates as a function of the flow sensors 202 and 208 will control the positioning of valve 200 within the area in air conduit 198. The heated hydrogen sulfide-sulfur dioxide stream is then passed through Claus catalytic converter 148 and the product passed in sequence through boiler 156 and condenser 164. Liquid sulfur is removed via conduit 172 and the tail gas removed via conduit 174 can be passed through an incinerator or alternately to the reducing reactor which is schematically depicted in FIG. 7 below.

The above embodiments set forth in FIGS. 5 and 6 specifically describe gas mixer and reactors 10, 10a and 10b for a specific set of conditions. It is to be noted, however, that the number of acid gas nozzles, and the flow rates of fuel acid gas, and air to the various reactors can be varied as desired to produce the desired results in accordance with heat content of the fuel gas, and the hydrogen sulfide content of the acid gas. Furthermore, it is noted that either gas mixer and reactors 10a or 10b of FIG. 6 can be arranged to fire either $H_2S$ or fuel gas. If fuel gas is used in both units then lower concentrations of $H_2S$ can be processed. Furthermore, it is within the scope of the subject invention to use one or more gas mixers and reactors 10a and/or 10b in line with the catalytic reactor even with a main acid gas burner which is dissimilar to gas mixer and reactor 10.

Figure 7:
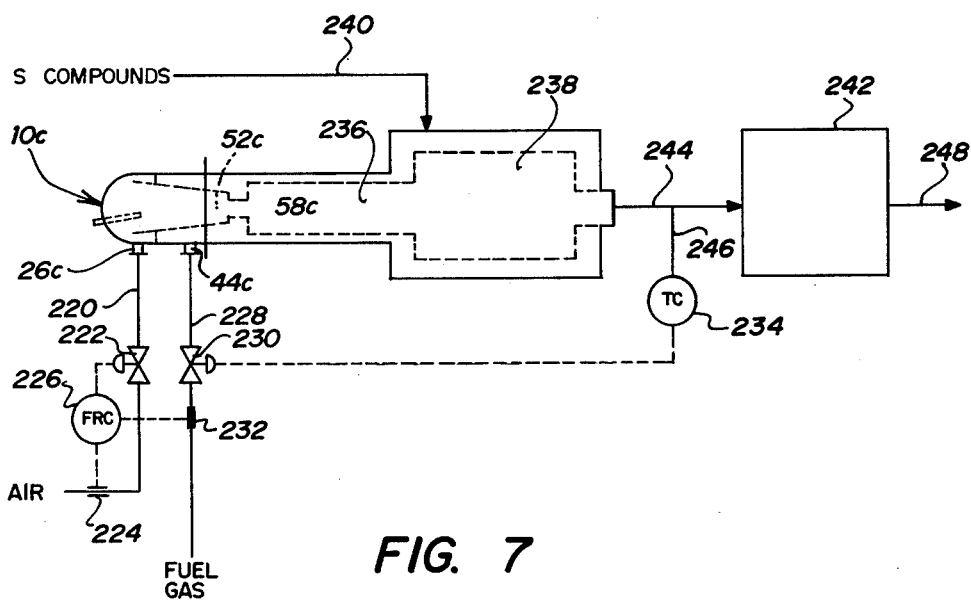
FIG. 7 is a schematic illustration showing the gas mixer and reactor of the subject invention utilized as a hydrogen generator for producing feed stream utilized to reduce sulfur compounds.

Now referring to FIG. 7, another embodiment of this invention is depicted showing gas mixer and reactor 10c furnishing a reducing gas for a catalytic converter of sulfur compounds. As shown in FIG. 7, gas mixer and reactor 10c can be substantially the same as gas mixer and reactor 10 shown in FIG. 1 except that nozzle apertures 40, annular manifold 46 and gas inlet port 48 are not necessary. These components can either be eliminated or gas inlet port 48 merely can be plugged. Thus as shown, gas inlet port 26c operatively communicates with air conduit 220. Air conduit 220 has flow control valve 222 and flow rate sensor 224 operatively disposed therein. Valve 222 is operatively connected to the output of flow ratio controller 226. Flow rate sensor 224 is operatively connected to an input of flow ratio controller 226. Gas inlet port 44c operatively communicates with fuel gas conduit 228. Flow control valve 230 and flow rate sensor 232 are operatively disposed within conduit 228. As shown, flow rate sensor 232 is operatively connected to an input of flow ratio controller 226. Furthermore valve 230 is operatively connected to the output of temperature controller 234. The outlet 58c communicates with combustion chamber 236. The outlet of combustion chamber 236 communicates with mixing chamber 238, inlet conduit 240 operatively communicates with the interior of mixing chamber 238 and delivers sulfur containing compounds therein such as the tail gas from conduit 174 of FIGS. 5 through 6 discussed above, for example. The outlet of mixing chamber 238 communicates with catalytic reactor 242 via conduit 244. Temperature sensor 246 is operatively disposed within conduit 244 and supplies an input to temperature controller 234 as illustrated in FIG. 7. The hydrogenated product is removed from catalytic converter 242 via conduit 248. Thus again referring to FIG. 7, air is delivered to inlet port 26c via conduit 220 and fuel, which can be a light hydrocarbon fuel gas, such as natural gas is delivered to gas inlet port 44c via conduit 228. The two gases are admixed and ignited within reaction zone 52c in a manner set forth above in the description of FIGS. 1 through 4 and the combusting products are passed through outlet 58c into combustion chamber 236. The ratio of air to fuel is such that fuel is burned to produce hydrogen, oxides of carbon and no free carbon. Thereafter the hot combustion gases which are at a temperature of about 3000° F. are admixed with sulfur containing compounds in mixing chamber 38 which are delivered thereto via conduit 240. The resulting admixture is passed into catalytic converter 242 via conduit 244. Temperature controller 234 maintains the temperature of the outlet gases at temperatures in the range from from about 500° F. to about 600° F. Catalytic converter 242 can contain any conventional hydrogenation catalysts such as cobalt-molybdenum on bauxite. The hydrogenated material is removed from catalytic converter 242 via conduit 248.

As a specific example of a gas mixer and reactor 10c which can be used in the scope of the subject invention, the device can have the following dimensions set forth in Table 8 below. It is noted that elongated gas flow chamber 22 is illustrated in this embodiment as having a frusto conical shape.

Table 8

| Inside diameter of: | |
|---|---|
| inlet of elongated gas flow chamber 22 | 14 1/3 inches |
| outlet of elongated gas flow chamber 22 and reaction chamber 52 | 5 7/10 inches |
| Length of elongated gas flow chamber | 13 1/8 inches |
| Length of thermal reaction chamber | 11 1/2 inches |

Table 8-continued

| Number of nozzle apertures 36 and/or 38 | 17 |
|---|---|
| Diameter of nozzle apertures | 7/32 inch |
| Height of inset annular step | 7/8 inch |
| Width of inset annular step | 3 3/4 inches |

Next, with this reactor 10c, methane is supplied to gas inlet conduit 44c at a rate of 2800 standard cu. ft. per hour and air is supplied to gas inlet port 26c at a rate of 16,000 standard cu. ft. per hour. This will convert approximately 6.0 moles per hour of sulfur compounds in catalytic converters 242 having a bed of cobalt-molybdenum catalyst on bauxite.

Figure 8:
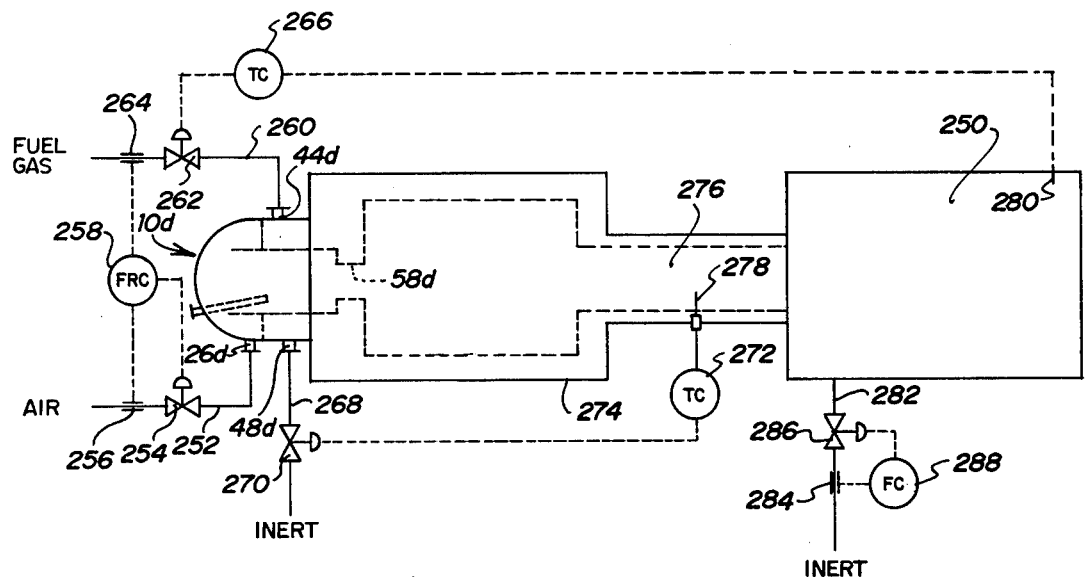
FIG. 8 is a schematic illustration of another embodiment of the subject invention showing the gas mixer and reactor of the subject invention as a kiln atmosphere controller.

Now referring to FIG. 8, another process is schematically depicted illustrating the gas mixer and reactor of the subject invention as gas mixer and reactor 10d. In this embodiment, gas mixer and reactor 10d is utilized to control the atmosphere within kiln 250. As shown, gas mixer and reactor 10d can have the same basic configuration as gas mixer and reactor 10c but with a series of nozzle apertures 40 (as shown in FIG. 1). Accordingly, air conduit 252 operatively communicates with gas inlet port 26d and has flow control valve 254 and flow rate sensor 256 operatively disposed therein. Valve 224 communicates with the output of flow ratio controller 258, and flow rate sensor 256 communicates with an input of flow ratio controller 258 as schematically depicted as FIG. 8. Gas inlet port 44d is in communication with fuel gas conduit 260. Fuel gas conduit 260 has flow control valve 262 and flow rate sensor 264 operatively disposed therein. Valve 262 is operatively connected to the output of temperature controller 266 and flow rate sensor 264 is operatively connected to an input of flow ratio controller 258. Inert gas inlet conduit 268 operatively communicates with gas inlet port 48d and has valve 270 disposed therein. Valve 270 is operatively connected to the output of temperature controller 272. The outlet 58d of gas mixer and reactor 10d communicates with the interior of furnace chamber 274. The duct 276 which forms the outlet of furnace chamber 274 communicates with the interior of kiln 250. Temperature sensor probe 278 communicates with the interior of duct 276 and transmits an input to temperature controller 272. In similar manner, temperature probe 280 communicates with the interior of kiln 250 and communicates an input to temperature controller 266.

In operation, gas mixer and reactor 10d is supplied with a light hydrocarbon fuel or natural gas via conduit 260. This fuel is burned in such a way to produce atmospheres which can be either free or high in hydrogen, carbon monoxide, oxygen and free carbon. An essentially neutral atmosphere exists at stoichiometric combustion conditions. With appropriate controls, firing rates can be varied to obtain desired time, composition, and temperature.

Moderation of the temperature within kiln 250 is obtained by introducing an inert gas through conduit 268. The inert gas is introduced through conduit 268 in response to temperature controller 272. This inert gas can comprise carbon dioxide, nitrogen, recycled products of combustion or any other inert gas which is non-deleterious to the kiln atmosphere. Inert fluid conduit 282 operatively communicates with the interior of kiln 250 and has flow sensor 284 and flow control valve 286 operatively positioned therein. Flow sensor 284 is operatively connected to the input of flow controller 288 and flow control valve 286 is operatively connected to the output of flow controller 288. This arrangement will provide a constant uniform flow of an inert gas into the interior of kiln 250. The inert gas can be the same type as passed through conduit 268. Thus temperature controller 272 can be preset at any suitable temperature and correlated with valve 270 to result in any desired temperature of the gases passing through duct 276. Likewise, temperature controller 266 can be correlated with valve 262 to cause increases and decreases in the kiln temperature as desired.

As an example of suitable operation, gas mixer and reactor 10d can have the basic configuration of gas mixer and reactor 10c, and when it is desired to produce an atmosphere containing free carbon the air rate can be adjusted to 16,000 standard cu. ft. per hour with a methane rate of 3200 standard cu. ft. per hour; and with the same air rate an oxygen free slightly reducing atmosphere is created by supplying methane at 1800 standard cu. ft. per hour. Furthermore, with the same air rate a neutral atmosphere is provided by supplying methane at 1750 standard cu. ft. per hour. Still furthermore, at the same air rate, a hydrogen free slightly oxidizing atmosphere is produced by supplying methane at a rate of 1700 standard cu. ft. per hour. Furthermore, still at the same air rate, an oxygen rich atmosphere provided by supplying the methane at a rate of 875 standard cu. ft. per hour.

In the operation of the process as depicted in FIG. 8, the neutral condition is the highest inert temperature condition, the theoretical flame temperature being about 3725° F. Inert gas can be injected via nozzle apertures 40 and gas inlet 48d to reduce the temperature. For example, at the stoichiometric rates cited (1750 standard cu. ft. per hour of methane and 16,000 standard cu. ft. per hour of air) about 4990 standard cu. ft. per hour of $CO_2$ will reduce the theoretical flame temperature about 1000° F. Introduction of $CO_2$ is done with 40 nozzle apertures each having a 7/32 inch diameter.

It is noted that while the above invention has been described in relation to its preferred embodiments, it is to to be understood that various modifications thereof will be apparent to one skilled in the art from the study of this specification and it is intended to cover such modifications as fall within the scope of the appended claims. For example, gas mixer and reactor can be utilized as either a natural or forced draft incinerator, for producing reducing gas for various operations such as smelting and metal working, heat treating and any other processes requiring hydrogen and/or carbon monoxide, and can be used in the production of carbon black and can be used to thermally decompose ammonia to produce hydrogen or with more oxygen to produce high purity nitrogen and in any indirect or direct heating operation and for boilers and many other combinations.

We claim:

1. A gas mixer and reactor comprising:
    (a) an elongated gas flow chamber having a first end which carries an inlet thereto and a second end which carries an outlet therefor;
    (b) a thermal reaction chamber communicating with said outlet at said second end of said elongated gas flow chamber;
    (c) injection means for injecting gas annularly into said elongated gas flow chamber through said inlet thereof towards said outlet thereof from points uniformly about the inner periphery of said elongated gas flow chamber;
    (d) gas nozzle means positioned adjacent said second end and around said elongated gas flow chamber, and directed into said elongated gas flow chamber and toward said thermal reaction chamber; and
    (e) an inset annular step in said thermal reaction chamber spaced from said outlet of said elongated gas flow chamber.

2. The gas mixer and reactor of claim 1 wherein said gas nozzle means positioned about said elongated gas flow chamber are directed at the intersection between said inset annular step and the inner periphery of said thermal reaction chamber.

3. The gas mixer and reactor of claim 2 wherein said gas nozzle means comprises a series of nozzle apertures positioned uniformly around said second end of said elongated gas flow chamber.

4. The gas mixer and reactor of claim 1 wherein said thermal reaction chamber comprises an inlet of the same basic configuration as the outlet of said elongated gas flow chamber, a combustion chamber, and an outlet spaced in alignment therefrom.

5. The gas mixer and reactor of claim 4 wherein said outlet of said thermal reaction chamber comprises an opening axial of said inset annular step.

6. The gas mixer and reactor of claim 5 further comprising a furnace chamber operatively communicating with said outlet of said thermal reaction chamber.

7. The gas mixer and reactor of claim 1 wherein said gas nozzle means positioned around the second end of said elongated gas flow chamber are directed to converge at a point on the axis of said thermal reaction chamber.

8. The gas mixer and reactor of claim 7 wherein said gas nozzle means comprises a series of nozzle apertures positioned uniformly around said second end of said elongated gas flow chamber.

9. The gas mixer and reactor of claim 1 wherein said gas nozzle means comprises a first series of nozzles positioned around said elongated gas flow chamber adjacent the outlet thereof.

10. The gas mixer and reactor of claim 9 further comprising a first annular gas manifold means positioned around said elongated gas flow chamber and operatively communicating with said first series of nozzles.

11. The gas mixer and reactor of claim 10 further comprising a second annular gas manifold means positioned about said elongated gas flow chamber and operatively communicating with said injection means.

12. The gas mixer and reactor of claim 11 wherein said second annular gas manifold means comprises an enclosure spaced from the first end of said elongated gas flow chamber thereby enclosing said first end thereof, and an inlet for said second annular gas manifold communicating therewith at a point between said inlet and said outlet of said elongated gas flow chamber.

13. The gas mixer and reactor of claim 12 wherein said gas nozzle means positioned around said second end of said elongated gas flow chamber are directed to converge and impinge at a point on the axis of said thermal reaction zone.

14. The gas mixer and reactor of claim 12 further comprising an inset annular step in said thermal reaction chamber spaced in alignment from said outlet of said elongated gas flow chamber, the opening axial of said inset annular step thereby forming an outlet of said thermal reaction chamber.

15. The gas mixer and reactor of claim 14 further comprising an enclosed furnace chamber having an inlet operatively connected to said outlet of said thermal reaction chamber, and an outlet spaced therefrom.

16. The gas mixer and reactor of claim 14 wherein said first set of nozzles positioned around said elongated gas flow chamber adjacent the outlet thereof are skewed in relation to one another and each such nozzle is directed through said thermal reaction chamber to a point at the intersection between said inset annular step and the inner periphery of said thermal reaction chamber on the sidewall of said reaction chamber opposite from each of such nozzles.

17. The gas mixer and reactor of claim 14 further comprising a second series of nozzles positioned around the second end of said elongated gas flow chamber and adjacent said first series of nozzles.

18. The gas mixer and reactor of claim 17 further comprising a third annular gas manifold positioned around said elongated gas flow chamber and operatively communicating with said second series of nozzles.

19. The gas mixer and reactor of claim 18 further comprising a radiation shield operatively positioned within said second annular gas manifold means adjacent the first end of said elongated gas flow chamber.

20. The gas mixer and reactor of claim 19 further comprising a sight port through said second annular gas manifold means and said radiation shield axial of said elongated gas flow chamber.

21. The gas mixer and reactor of claim 20 further comprising a gas pilot nozzle extending through said second annular gas manifold, said inlet of said elongated gas flow chamber and into the interior of said elongated gas flow chamber.

22. The gas mixer and reactor of claim 1 further comprising a gas mixing chamber operatively communicating with the outlet of said thermal reaction chamber.

23. The gas mixer and reactor of claim 1 further comprising a furnace chamber operatively communicating with said outlet of said thermal reaction chamber.

24. The combination of claim 11 further comprising means to pass a hydrogen sulfide containing gas to said first annular gas manifold and means to pass air to said second annular gas manifold means.

* * * * *